US007726838B2

(12) United States Patent
Wang et al.

(10) Patent No.: US 7,726,838 B2
(45) Date of Patent: Jun. 1, 2010

(54) ELECTRONIC DEVICE THAT FACILITATE LOCATING CONNECTION PORT THEREOF

(75) Inventors: Shun-Lung Wang, Taipei (TW); Wen-Chieh Tseng, Taipei (TW); Chia-Lin Tai, Taipei (TW); Chia-Ying Lee, Taipei (TW); Ching-Ke Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/341,060

(22) Filed: Dec. 22, 2008

(65) Prior Publication Data
US 2009/0168435 A1 Jul. 2, 2009

(30) Foreign Application Priority Data
Dec. 27, 2007 (TW) .............................. 96150596 A

(51) Int. Cl.
*F21V 33/00* (2006.01)
(52) U.S. Cl. .................. 362/249.02; 362/253; 362/234; 362/800
(58) Field of Classification Search ......... 362/543–545, 362/249.02, 253, 234, 800
See application file for complete search history.

(56) References Cited
U.S. PATENT DOCUMENTS
5,550,755 A * 8/1996 Martin et al. .......... 340/825.36

6,330,307 B1 * 12/2001 Bloch et al. .................... 379/25
6,499,861 B1 * 12/2002 German et al. .............. 362/253

FOREIGN PATENT DOCUMENTS
CN 2577330 10/2003
CN 2747613 12/2005
CN 2819878 9/2006

OTHER PUBLICATIONS
English language translation of abstract of 2577330.
English language translation of abstract of 2747613.
English language translation of abstract of 2819878.

* cited by examiner

*Primary Examiner*—Laura Tso
(74) *Attorney, Agent, or Firm*—Thomas, Kayden, Horstemeyer & Risley

(57) ABSTRACT

An electronic device that facilitate locating connection port thereof is described. The main portion has a lateral surface. The connection port is disposed on the lateral surface. The identification symbol is disposed on the lateral surface. The light source is disposed within the main portion and operable to emit light through the identification symbol so as to project a pattern of the identification symbol on a surface, which supports the main portion. The connection port on a lateral surface of the electronic device is located according to where the pattern of the identification symbol is located.

7 Claims, 3 Drawing Sheets

ELECTRONIC DEVICE THAT FACILITATE LOCATING CONNECTION PORT THEREOF

RELATED APPLICATIONS

This application claims priority to Taiwan Application Serial Number 96150596, filed Dec. 27, 2007, which are herein incorporated by reference.

BACKGROUND

1. Field of Invention

The present invention relates to an electronic device that facilitates locating connection port thereof.

2. Description of Related Art

The computers or computing devices are all equipped with powerful computing and communication capabilities whatever their sizes are large or small. In order to expand more functionalities for the computers, several types of connection ports are designed on the main body to electrically coupled with other peripheral devices.

Take a notebook computer as example, its housing is equipped with different connection ports, i.e. USB port, VGA port an etc. Those connection ports are located differently on different brand of notebook computers. Thus, users usually take a while to locate connection ports when they would like to use them at the first time. Moreover, it is somewhat difficult for users to locate connection ports under a dim environment, i.e. a conference room with all lamps off for a projector displaying images on a screen.

SUMMARY

It is therefore an objective of the present invention to provide an electronic device that facilitate locating connection port thereof.

In accordance with the foregoing and other objectives of the present invention, an electronic device includes a main portion, a connection port, an identification symbol and a light source. The main portion has a lateral surface. The connection port is disposed on the lateral surface. The identification symbol is disposed on the lateral surface. The light source is disposed within the main portion and operable to emit light through the identification symbol so as to project a pattern of the identification symbol on a surface, which supports the main portion.

In accordance with the foregoing and other objectives of the present invention, an electronic device that facilitate locating connection port thereof allows a pattern of an identification symbol to identify a connection port is projected from an electronic device toward a surface, which supports the electronic device. The connection port on a lateral surface of the electronic device is located according to where the pattern of the identification symbol is located.

Thus, the present invention provides a way or mechanism for a user to locate a connection port on a lateral surface of an electronic device by a corresponding illuminated identification symbol on a top surface or a corresponding projected pattern of the identification symbol on the surface under a dim environment.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
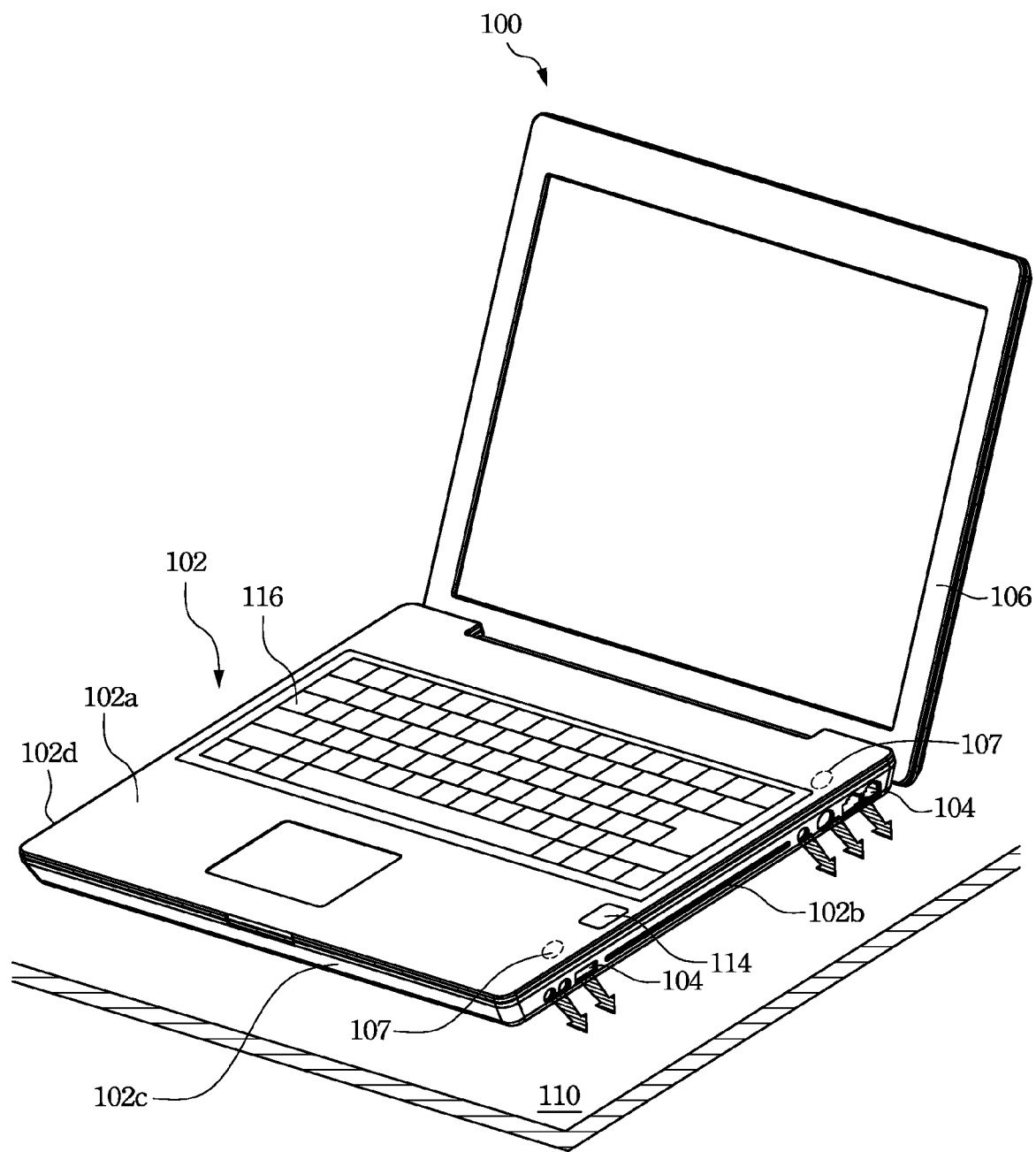
FIG. 1 illustrates an electronic device according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates an electronic device according to one preferred embodiment of this invention. The electronic device 100 includes a main portion 102 and a display portion 106. The main portion 102 includes a top surface 102a with a keyboard 116 allowing users to input information or data. The main portion 102 also has a lateral surface 102b, which includes several connection ports 104 thereon. Several light sources 104 (such as light emitting diode) are installed within the main portion 102. When the light sources 104 illuminate the lateral surface 102b, the patterns are projected onto a surface (may be the surface supporting the electronic device) 110. Therefore, the connection ports 104 on the lateral surface 102b can be located according to the patterns. In this embodiment, the connection ports 104 are designed on the lateral surface 102b. However, the connection ports can be designed on other lateral surfaces of the main portion 102, i.e. lateral surfaces 102c or 102d. When the main portion 102 is placed on the surface 110, which supports a bottom surface 102e of the main portion 102 (referring to FIG. 2), the lateral surfaces, i.e. 102b, 102c or 102d, of the main portion 102 are immediately-adjacent to the bottom surface 102e (compared with the top surface 102a).

Figure 2:
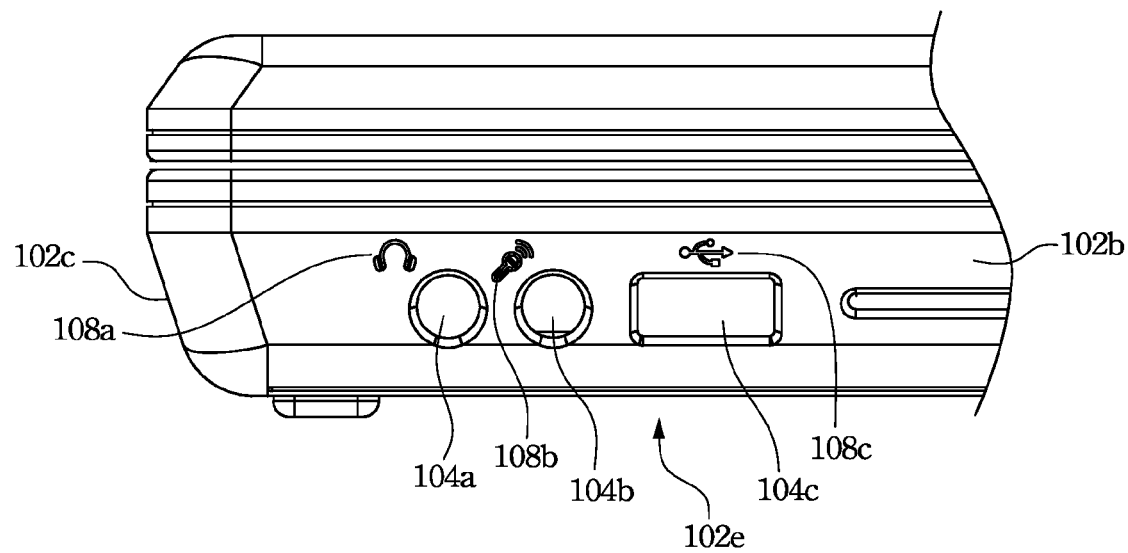
FIG. 2 illustrates a side view of the electronic device as illustrated in FIG. 1.
Figure 3:
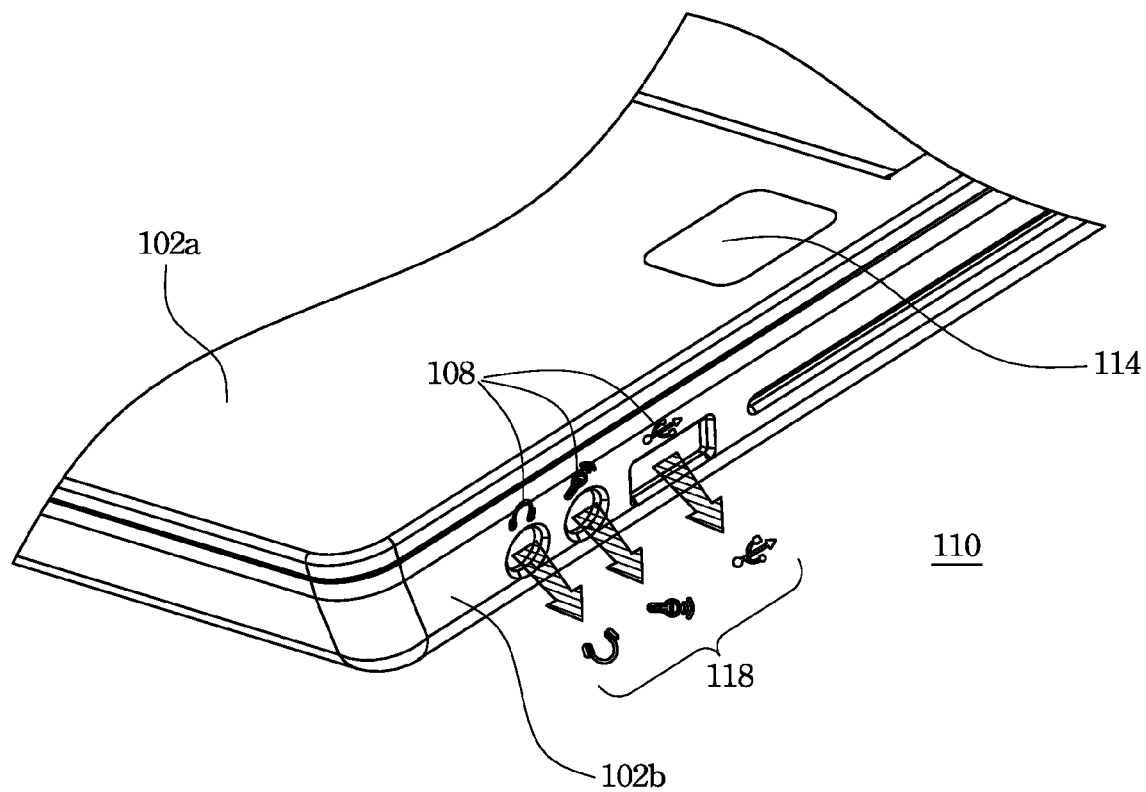
FIG. 3 illustrates how the connection port being located by projecting its pattern.

FIG. 2 illustrates a side view of the electronic device as illustrated in FIG. 1. FIG. 3 illustrates how the connection port being located by projecting its pattern. Aside from connection ports 104 designed on the lateral surface 102b of the main portion 102, identification symbols are designed thereon to identify the connection ports, i.e. the identification symbol 108a (an earphone pattern) is used to identify the connection port 104a; the identification symbol 108b is used to identify the connection port 104b; the identification symbol 108c is used to identify the connection port 104c. The identification symbols are not limited to those patterns illustrated in the drawings, and may include any customized identification symbol. When the light sources 107 within the main portion 102 emit light through or illuminate the identification symbols 108, the patterns 118 of the identification symbols 108 are projected onto the surface 110. Users may locate either one of the patterns 118 first and then locate a corresponding one of the connection ports 104 on the lateral surface 102b. This way for locating a connection port is preferably used in but not limited to a dim environment. It should be noted that the light sources 107 within the main portion 102 should emit light beams, which form an included angle, i.e. 45 degrees, between the surface 110 and the light beams. The included angle may vary according to another included angle between the surface 110 and the lateral surface 102b. For instance, the included angle between the surface 110 and the lateral surface 102b is 45 degrees; the light sources 107 may be positioned close to the lateral surface 102b. Above all, in case the patterns 118 of the identification symbols 108 can be readily visible on the surface 110, any included angle or light source arrangement should be suitable.

The lateral surface 102b of the main portion 102 may be designed by two ways. The first way is to have the lateral surface 102b made of opaque materials and have the identification symbols 108 made of transparent materials or be empty or hollow patterns. When the light sources 107 within the main portion 102 emit light through or illuminate the identification symbols 108, the patterns 118 on the surface 110 would be identification symbols (same shape as the identification symbols 108) in relatively bright and surrounded by a relatively dark area. The other way is to have lateral surface 102b made of transparent materials and have the identification symbols 108 made of opaque materials. When the light sources 107 within the main portion 102 emit light through or illuminate the identification symbols 108, the patterns 118 on the surface 110 would be identification symbols (same shape as the identification symbols 108) in relatively dark and surrounded by a relatively bright area.

In this embodiment, the top surface 102a of the main portion 102 has a switch button 114, to be pushed by users, for selectively turning on or off the light sources 107 within the main portion 102. When the light sources 107 are turned on, the patterns 118 of the identification symbols would be projected on the surface 110 and the connection ports 104 on the lateral surface 102b are thence located readily.

Figure 4:
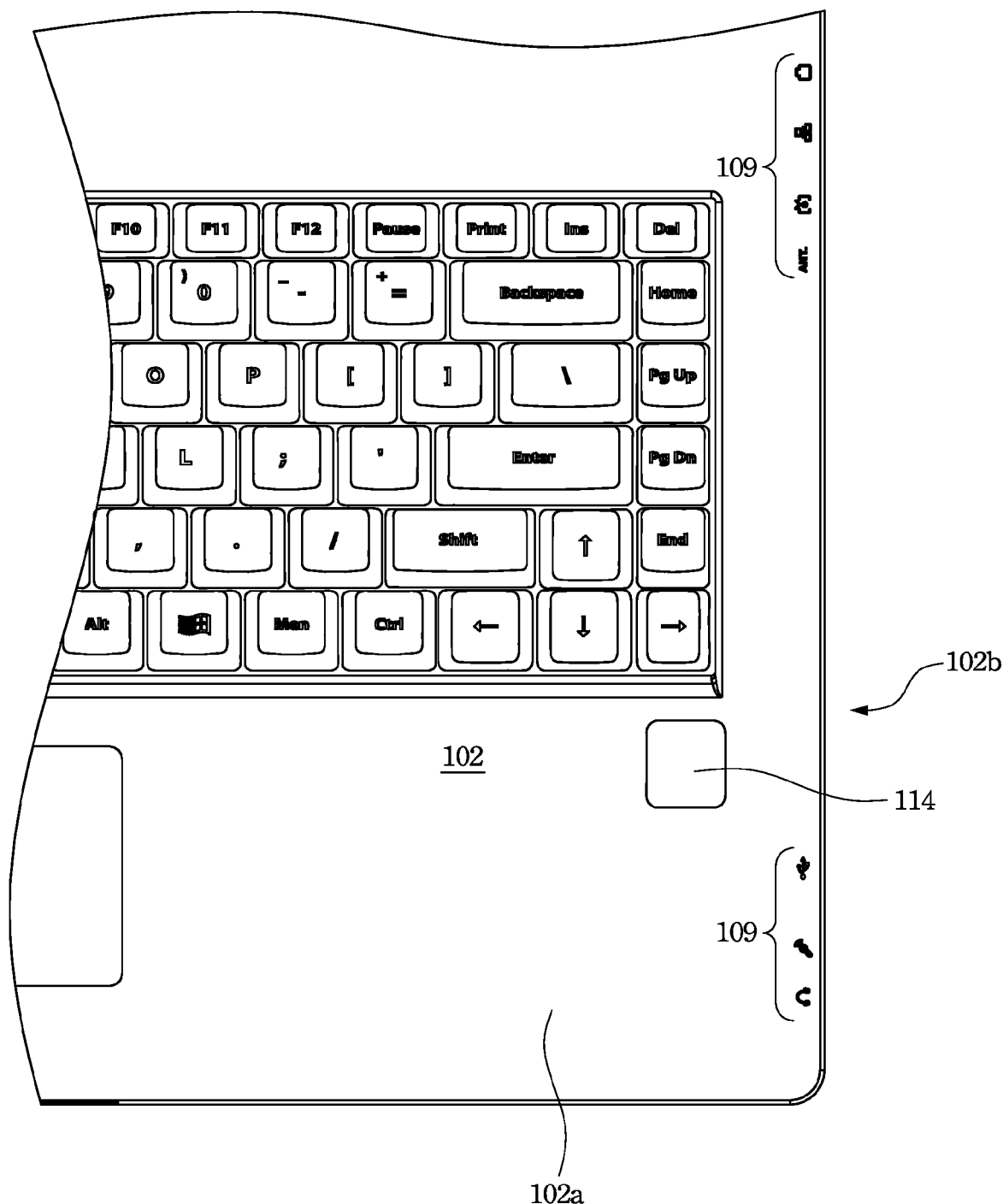
FIG. 4 illustrates a top view of the electronic device as illustrated in FIG. 1.

FIG. 4 illustrates a top view of the electronic device as illustrated in FIG. 1. The identification symbols may be alternately or optionally designed on the top surface 102a of the main portion 102, i.e. the identification symbols may be designed on the top surface 102a or the lateral surface 102b; or the identification symbols may be designed both on the top surface 102a and the lateral surface 102b. There are two ways to design the identification symbols 109 on the top surface 102a of the main portion 102. The first way is to the identification symbols printed on the opaque top surface 102a, users can recognize or locate the identification symbols 109 merely under an environment with adequate light, rather than under a dim environment. The other way is to have the top surface 102a made of opaque materials and have the identification symbols 109 made of transparent materials or be empty or hollow patterns. When the light sources 107 are turned on within the main portion 102, the identification symbols 109 would be illuminated under a dim environment. In such case, users can locate the connection port on the lateral surface 102b either by the illuminated identification symbols 109 or by the projected patterns 118 on the surface 110 (referring to FIG. 3) under a dim environment.

In this embodiment, the electronic device 100 is a notebook computer, but can also be a mobile phone, a personal digital assistant, a desktop computer or a tablet computer. The identification symbols are not limited to those patterns illustrated in the drawings, and may include any customized identification symbol.

According to discussed embodiments, the present invention provides a way or mechanism for a user to locate a connection port on a lateral surface of an electronic device by a corresponding illuminated identification symbol on a top surface or a corresponding projected pattern of the identification symbol on the surface under a dim environment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic device, comprising:
a main portion having a lateral surface;
a connection port disposed on the lateral surface;
an identification symbol disposed on the lateral surface; and
a light source disposed within the main portion and being operable to emit light through the identification symbol so as to project a pattern of the identification symbol on an external surface.

2. The electronic device of claim 1, wherein the main portion further comprises a top surface, the top surface comprising a second identification symbol.

3. The electronic device of claim 2, wherein the second identification symbol is a transparent pattern on the top surface.

4. The electronic device of claim 1, wherein the identification symbol is a transparent pattern on the lateral surface.

5. The electronic device of claim 1, wherein the identification symbol is an opaque pattern on the lateral surface.

6. The electronic device of claim 1, wherein the light source is a light emitting diode.

7. The electronic device of claim 1, wherein the electronic device is a mobile phone, a personal digital assistant, a notebook computer, a desktop computer or a tablet computer.

* * * * *